(12) United States Patent
Fujiwara et al.

(10) Patent No.: US 8,172,408 B2
(45) Date of Patent: May 8, 2012

(54) LENS POSITION ADJUSTING MECHANISM

(75) Inventors: Hiromi Fujiwara, Osaka (JP); Shigeru Matsumoto, Osaka (JP); Hiroki Koba, Osaka (JP)

(73) Assignee: Panasonic Corporation, Osaka (JP)

( * ) Notice: Subject to any disclaimer, the term of this patent is extended or adjusted under 35 U.S.C. 154(b) by 517 days.

(21) Appl. No.: 12/417,276

(22) Filed: Apr. 2, 2009

(65) Prior Publication Data

US 2009/0251671 A1 Oct. 8, 2009

(30) Foreign Application Priority Data

Apr. 4, 2008 (JP) .................................. 2008-097914

(51) Int. Cl.
*G03B 21/14* (2006.01)
*G02B 7/02* (2006.01)
(52) U.S. Cl. .......... 353/101; 353/24; 353/100; 359/813; 359/822
(58) Field of Classification Search .................. 353/101, 353/24, 100; 359/811, 813, 819, 822
See application file for complete search history.

(56) References Cited

U.S. PATENT DOCUMENTS 6,000,802 A * 12/1999 Hashizume et al. ............ 353/38

FOREIGN PATENT DOCUMENTS

| JP | 5-014594 A | 1/1993 |
| JP | 2000-330194 A | 11/2000 |
| JP | 2006-003446 A | 1/2006 |

* cited by examiner

*Primary Examiner* — Georgia Y Epps
*Assistant Examiner* — Magda Cruz
(74) *Attorney, Agent, or Firm* — Hamre, Schumann, Mueller & Larson, P.C.

(57) ABSTRACT

A lens position adjusting mechanism includes a lens, a lens attachment frame that includes a lens holding portion for holding the rim of the lens, and a holding case that sandwiches the lens attachment frame movably in a plane direction perpendicular to an optical axis of the lens. The lens attachment frame includes a shaft portion on the periphery of the lens holding portion, functioning as a fulcrum at a time when the lens attachment frame moves in the plane direction. The holding case includes a shaft supporting portion for supporting the shaft portion and frame guide grooves for sandwiching the lens attachment frame. The position of the lens is adjusted by operating a lug portion by fingers or the like with the shaft portion as a fulcrum. Then the adjusted position is fixed by injecting an adhesive into wedge spaces formed of opposing adhesion grooves.

13 Claims, 7 Drawing Sheets

LENS POSITION ADJUSTING MECHANISM

BACKGROUND OF THE INVENTION

1. Field of the Invention

The present invention relates to a lens position adjusting mechanism for positioning an illumination light region accurately in an image-forming region of an image display element, and to a projection-type display device utilizing the mechanism.

2. Description of Related Art

Conventionally, a projection-type display device, typified by a projector and the like, includes a mechanism for adjusting the position of a lens placed in an illumination optical system so as to position illumination light from a light source accurately in an image-forming region of an image display element.

FIG. 7 is a perspective view showing an example of such a lens position adjusting mechanism described in JP 2000-330194A. A lens position adjusting mechanism 300 includes a fixing frame 320, an attachment frame 330, and screws 340a, 340b as adjusting members.

The attachment frame 330 with a superimposed lens 150 attached thereto is supported by the fixing frame 320. The fixing frame 320 is fixed to an upper light guide (not shown) that is a housing for optical components. The screws 340a, 340b function as adjusting members for adjusting the attachment position of the superimposed lens 150 by moving the attachment frame 330 with respect to the fixing frame 320.

In adjusting a lens position, when the screw 340a is turned clockwise, the attachment position of the superimposed lens 150 moves upward. Conversely, when the screw 340a is turned counterclockwise, the attachment position of the superimposed lens 150 moves downward. The same turning operation of the screw 340b can move the attachment position of the superimposed lens 150 horizontally.

However, in the conventional configuration described above, it requires a great deal of time for adjustment since two screws 340a, 340b are turned separately.

SUMMARY OF THE INVENTION

The present invention solves the conventional problem, and its object is to provide a lens position adjusting mechanism capable of adjusting a lens position promptly with a simple configuration and improving the workability in adjustment, fixation, and the like, and a projection-type display device utilizing the mechanism.

In order to solve the foregoing conventional problem, a lens position adjusting mechanism according to the present invention includes: a lens; a lens attachment frame that includes a lens holding portion for holding a rim of the lens; and a holding case that sandwiches the lens attachment frame movably in a plane direction perpendicular to an optical axis of the lens, wherein the lens attachment frame includes a shaft portion on a periphery of the lens holding portion. The shaft portion functions as a fulcrum at a time when the lens attachment frame moves in the plane direction, and the holding case includes a shaft supporting portion for supporting the shaft portion and frame guide groove for sandwiching the lens attachment frame.

According to the lens position adjusting mechanism with this configuration, it is possible to position a lens accurately and promptly with a simple configuration by adjusting an illumination region vertically and horizontally within an image-forming region of an image display element. Thus, the workability in adjustment, fixation, and the like of the lens position can be improved.

DETAILED DESCRIPTION OF THE INVENTION

Figure 1A:
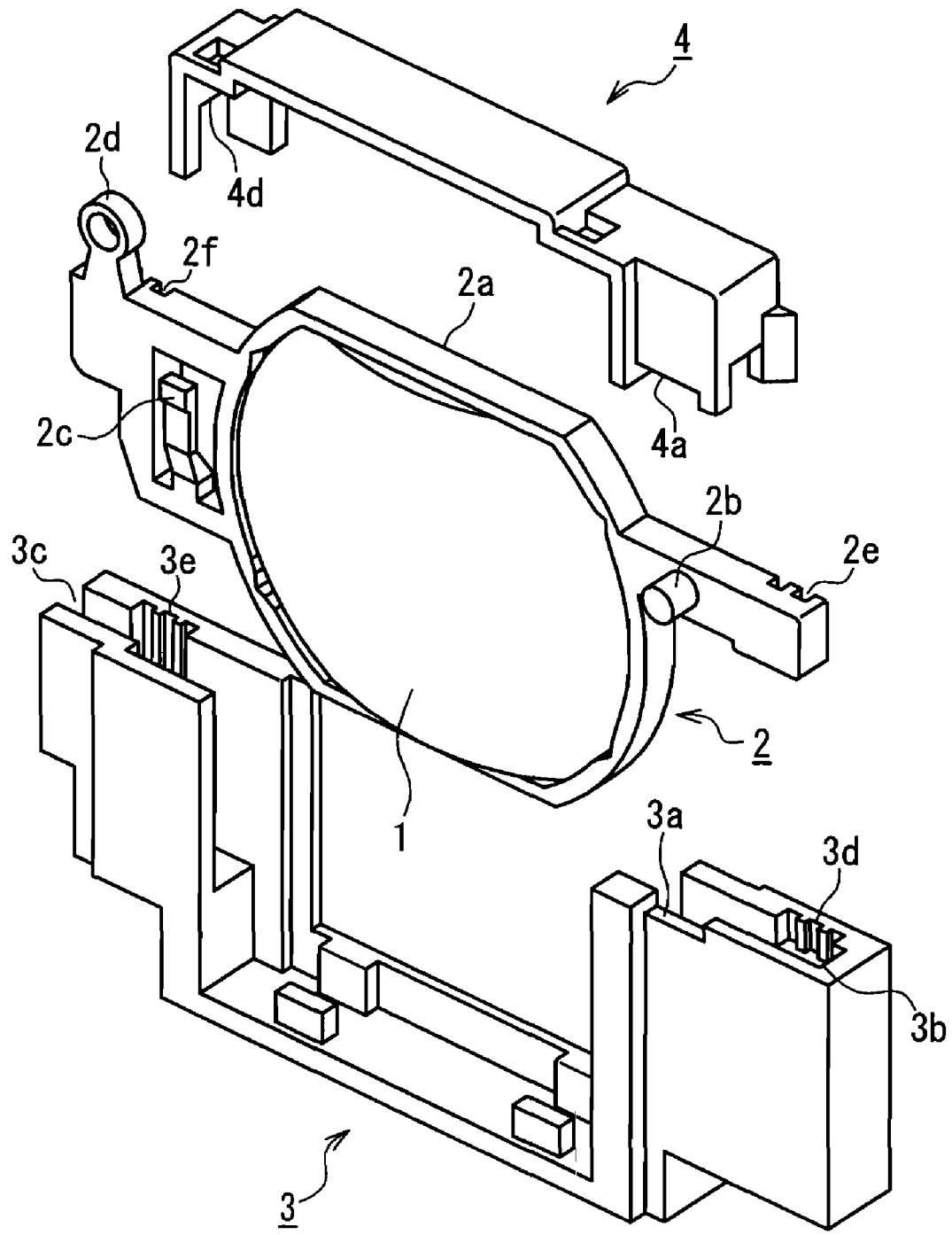
FIG. 1A is an exploded perspective view showing a lens position adjusting mechanism in one embodiment of the present invention.

Based on the configuration described above, the lens position adjusting mechanism of the present invention can assume the following aspects.

The lens holding portion preferably is thicker than the lens. The lens attachment frame preferably has a lug portion configured to be held by a finger or an adjustment appliance on the periphery of the lens holding portion. Further, the shaft portion of the lens attachment frame preferably is in a columnar shape.

The shaft supporting portion of the holding case can support the shaft portion of the lens attachment frame movably. In that case, the shaft supporting portion can support the shaft portion of the lens attachment frame movably in one direction. Further, the shaft supporting portion can be formed of a shaft guide groove separable into upper and lower portions so as to support the shaft portion of the lens attachment frame movably in one direction.

It is preferable that either the lens attachment frame or the holding case has an elastic portion, and the lens attachment frame is biased to the holding case by the elastic portion in a state in which the lens attachment frame is sandwiched in the frame guide groove of the holding case. In that case, the elastic portion can be formed integrally with either the lens attachment frame or the holding case.

The lens attachment frame can have a configuration in which the shaft portion is disposed on one side and the elastic portion is disposed on a side opposite to the shaft portion with the lens interposed therebetween. In that case, the lug portion of the lens attachment frame preferably is provided on the elastic portion side.

The lens attachment frame and the holding case can have adhesion grooves for application of an adhesive material. The adhesion grooves preferably are formed of a plurality of grooves disposed parallel to one another. Further, it is preferable that the adhesion grooves respectively are provided so as to be opposed to each other in the lens attachment frame and the holding case, thereby forming wedge spaces extending across both the lens attachment frame and the holding case. Further, at least one of the adhesion grooves provided in the lens attachment frame and the holding case can be formed in a two-step depth from respective surfaces of the lens attachment frame and the holding case.

A projection-type display device of the present invention includes: a light source that emits illumination light; an image display element that forms an optical image by modulating the illumination light; the lens position adjusting mechanism according to any one of the above-described configurations that includes a lens for positioning the illumination light from the light source in an image-forming region of the image display element; and a projection optical system that enlarges and projects the optical image formed by the image display element.

Hereinafter, a lens position adjusting mechanism in one embodiment of the present invention will be described with reference to the drawings.

EMBODIMENT

Figure 1B:
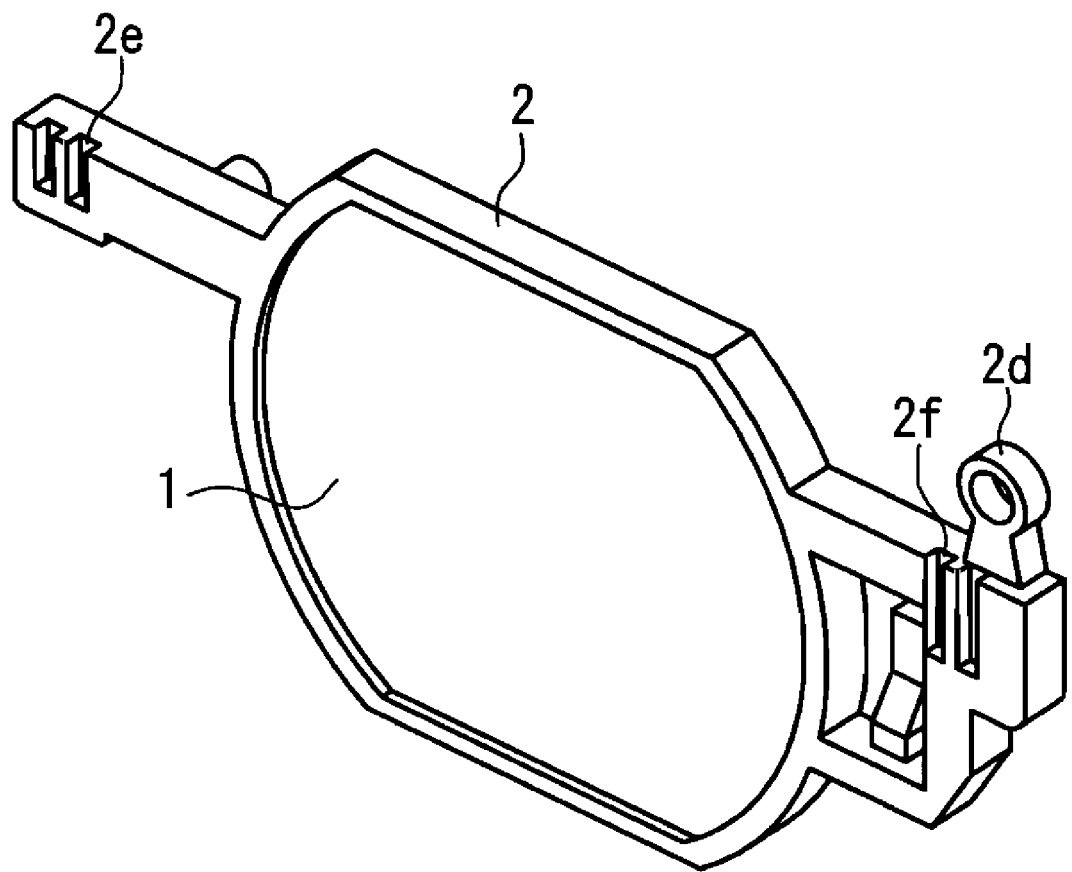
FIG. 1B is a perspective view of a lens attachment frame that is an element of the lens position adjusting mechanism, viewed from a rear surface side.
Figure 2A:
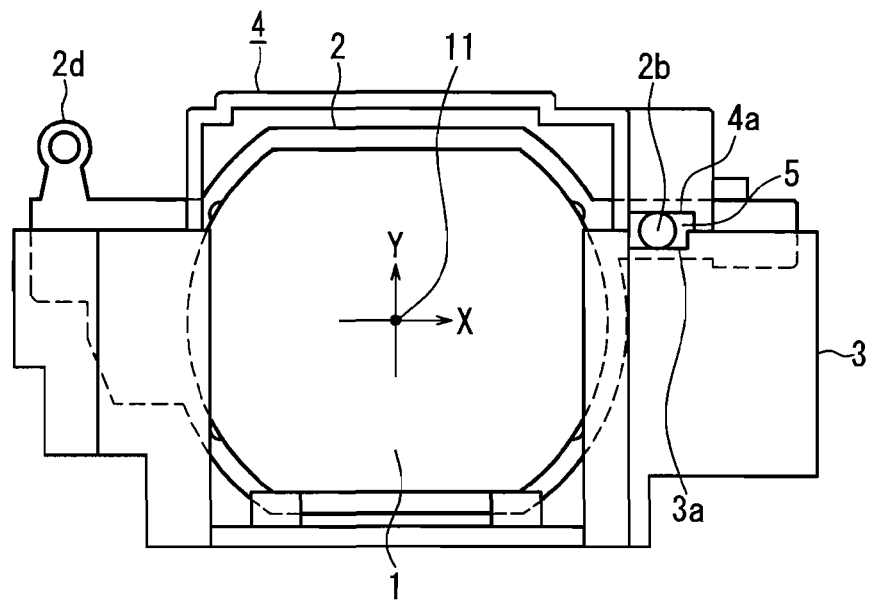
FIG. 2A is a front cross-sectional view showing an assembled state of the lens position adjusting mechanism.
Figure 2B:
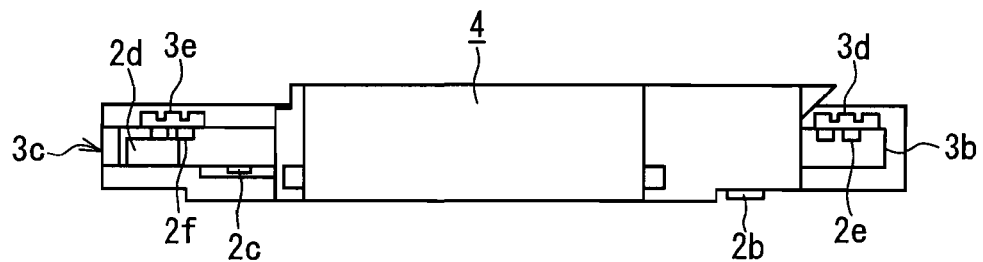
FIG. 2B is a top view of an assembled state of the lens position adjusting mechanism.
Figure 2C:
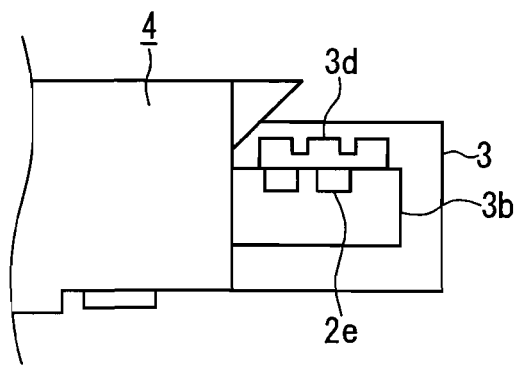
FIG. 2C is an enlarged view of a main portion of an assembled state of the lens position adjusting mechanism.

FIG. 1A is an exploded perspective view showing a lens position adjusting mechanism in one embodiment of the present invention, viewed from a front surface side. FIG. 1B is a perspective view of a lens attachment frame 2 included in the lens position adjusting mechanism in FIG. 1A, viewed from a rear surface side. FIG. 2A is a front cross-sectional view showing an assembled state of the lens position adjusting mechanism; FIG. 2B is a top view thereof, and FIG. 2C is an enlarged view of a main portion thereof.

In the drawings, reference numeral 1 denotes a plate lens, which is attached to a lens attachment frame 2 in such a manner that the rim of lens is held by the lens attachment frame 2. The lens attachment frame 2 is made of a resin plate, and a lens holding portion 2a holding at least the lens 1 is configured to be thicker than the lens 1. The reason for this is to protect the lens 1 from coming into contact with another member to be scratched during adjustment of a lens position.

The lens attachment frame 2 has a columnar shaft portion 2b and an elastic portion 2c formed on the periphery of the lens holding portion 2a The shaft portion 2b and the elastic portion 2c are disposed opposite to each other with the lens 1 interposed therebetween. The elastic portion 2c has elasticity in the width direction of the lens attachment frame 2. In the vicinity of the elastic portion 2c of the lens attachment frame 2, a lug portion 2d is provided. The lug portion 2d is configured to be held not only by operators' fingers but also by a jig. The lens attachment frame 2 further is provided with adhesion grooves 2e, 2f.

A holding case for holding the lens attachment frame 2 is formed by coupling a lower holding case 3 and an upper holding case 4 vertically. The lower holding case 3 is provided with a shaft-regulating recessed portion 3a, frame guide grooves 3b, 3c, and adhesion grooves 3d, 3e. The upper holding case 4 is provided with a shaft-regulating recessed portion 4a and a frame-regulating recessed portion 4b.

A shaft guide groove 5 is formed of the shaft-regulating recessed portion 3a of the lower holding case 3 and the shaft-regulating recessed portion 4a of the upper holding case 4 (see FIG. 2A). In the shaft guide groove 5, the shaft portion 2b of the lens attachment frame 2 is sandwiched movably in the horizontal direction. As described later, the shaft guide groove 5 also functions as a shaft supporting portion to move the lens attachment frame 2 vertically with the shaft portion 2b as a fulcrum. Further, a portion of the lens attachment frame 2 is sandwiched by the frame guide grooves 3b, 3c of the lower holding case 3.

The adhesion grooves 2e, 2f of the lens attachment frame 2 and the adhesion grooves 3d, 3e of the lower holding case 3 are provided for injecting an adhesive. These grooves are disposed opposite to each other.

In a projection-type display device such as a projector, the lens position adjusting mechanism with the above configuration is used for adjusting the position of a lens placed in an illumination optical system so as to position illumination light from a light source accurately in an image-forming region of an image display element. Hereinafter, a method for assembling the lens position adjusting mechanism will be described.

As shown in FIGS. 1A and 1B, the lens attachment frame 2, with a lens 1 attached thereto, is placed on the lower holding case 3. At that time, the lens attachment frame 2 is inserted into the frame guide grooves 3b, 3c of the lower holding case 3 so that the shaft portion 2b of the lens attachment frame 2 is placed in the shaft-regulating recessed portion 3a of the lower holding case 3 simultaneously.

When the lens attachment frame 2 is inserted into the frame guide groove 3c of the lower holding case 3, the elastic portion 2c is inserted into the frame guide groove 3c. Accordingly, the lens attachment frame 2 is biased to the lower holding case 3 by the elastic portion 2c. Consequently, the lens attachment frame 2 does not move by its own weight with respect to the lower holding case 3.

Then, by attaching the upper holding case 4 thereon, the shaft portion 2b of the lens attachment frame 2 is sandwiched between the shaft-regulating recessed portion 3a of the lower holding case 3 and the shaft-regulating recessed portion 4a of the upper holding case 4.

Next, a method for adjusting the position of a lens will be described with reference to FIGS. 3, 4, 5A, 5B, 6A, and 6B. FIGS. 3, 4, 5A, and 6A are front cross-sectional views showing adjusted states different from each other. FIG. 5B and FIG. 6B are side views corresponding to FIG. 5A and FIG. 6A, respectively.

Figure 3:
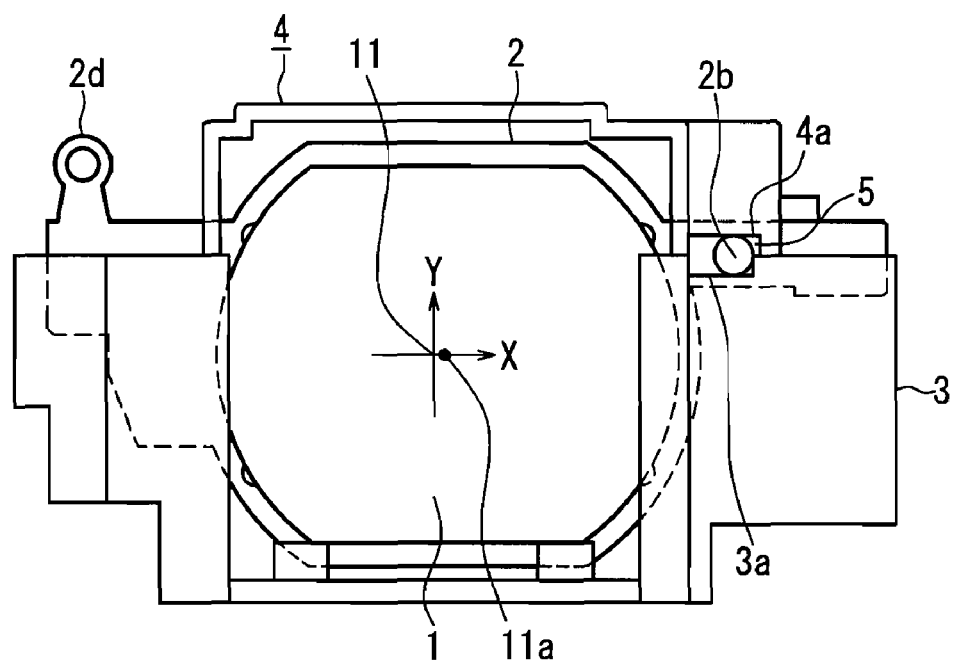
FIG. 3 is a front cross-sectional view showing an adjusted state of the lens position adjusting mechanism.
Figure 4:
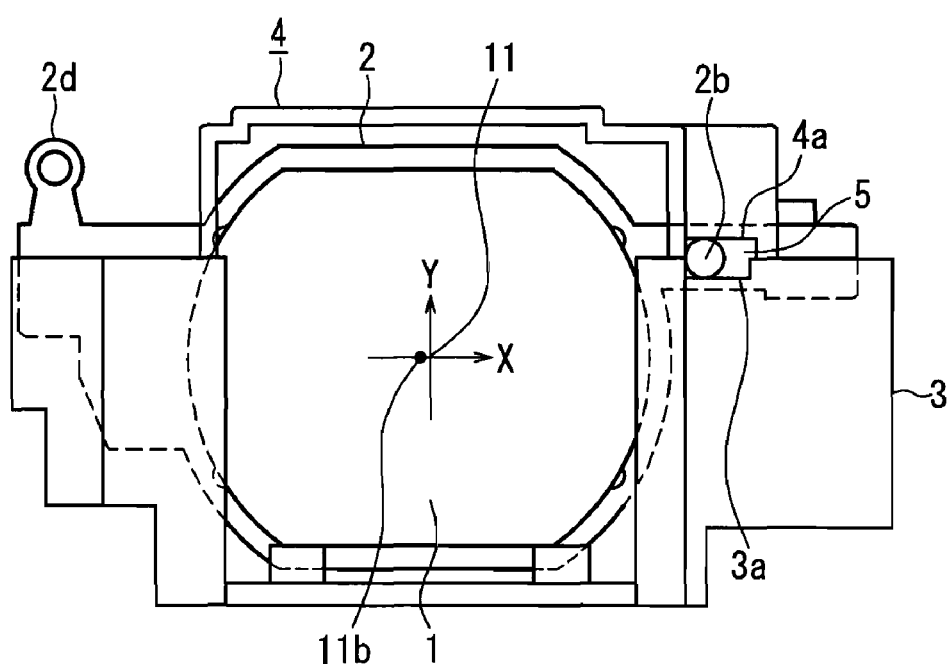
FIG. 4 is a front cross-sectional view showing another adjusted state of the lens position adjusting mechanism.
Figure 5A:
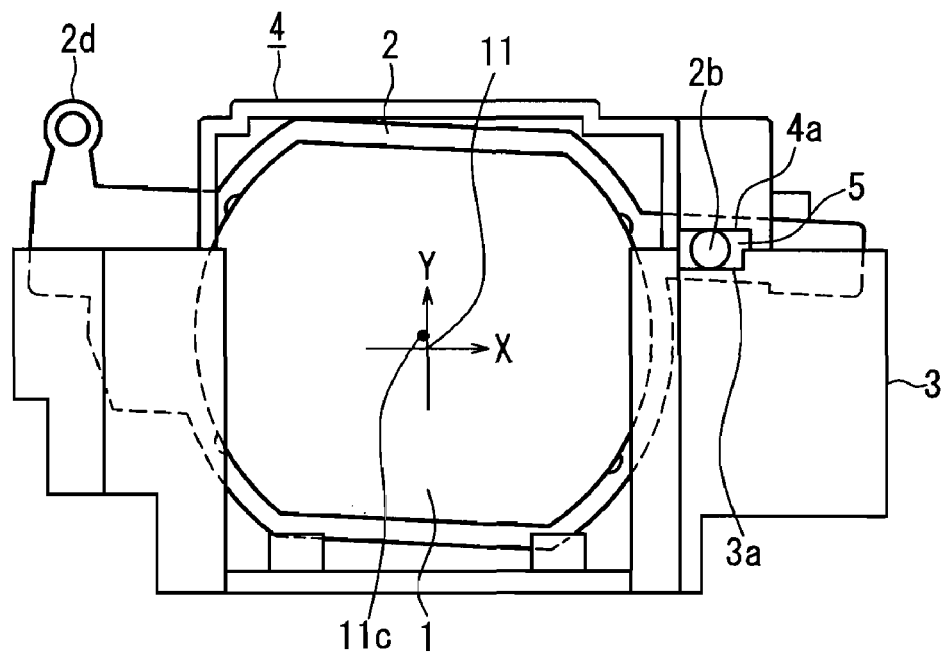
FIG. 5A is a front cross-sectional view showing another adjusted state of the lens position adjusting mechanism.
Figure 5B:
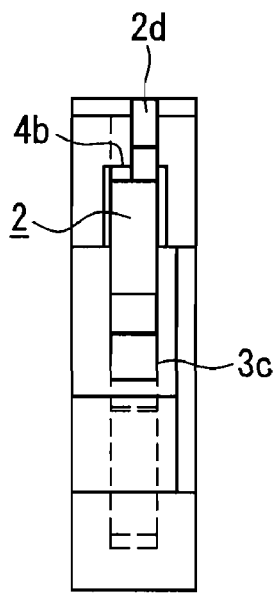
FIG. 5B is a side view of the lens position adjusting mechanism in the adjusted state.

For example, when it is desired to move the center of the lens 1 in an X-direction (horizontal direction) from an original point 11 of movement, the operation is conducted as shown in FIGS. 3 and 4. That is, by operating the lug portion 2d, the shaft portion 2b is moved in the X-direction (horizontal direction) within the shaft guide groove 5, which is formed of the shaft-regulating recessed portions 3a and 4a. Thus, the center of the lens 1 can be moved between a point 11a on the right side (FIG. 3) and a point 11b on the left side (FIG. 4).

The movable range in the X-direction in this case can be set freely within the sizes in the X-direction of the shaft-regulating recessed portion 3a of the lower holding case 3 and the shaft-regulating recessed portion 4a of the upper holding case 4.

Figure 6A:
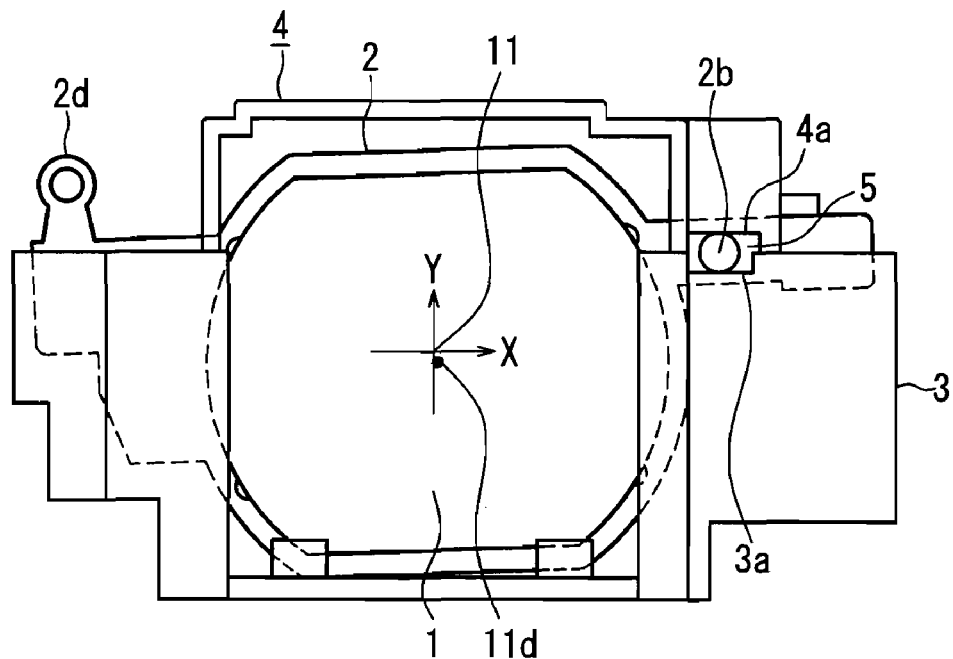
FIG. 6A is a front cross-sectional view showing another adjusted state of the lens position adjusting mechanism.
Figure 6B:
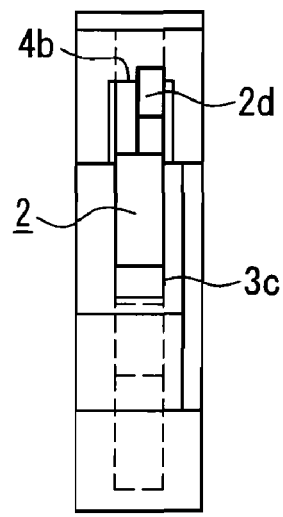
FIG. 6B is a side view of the lens position adjusting mechanism in the adjusted state.
Figure 7:
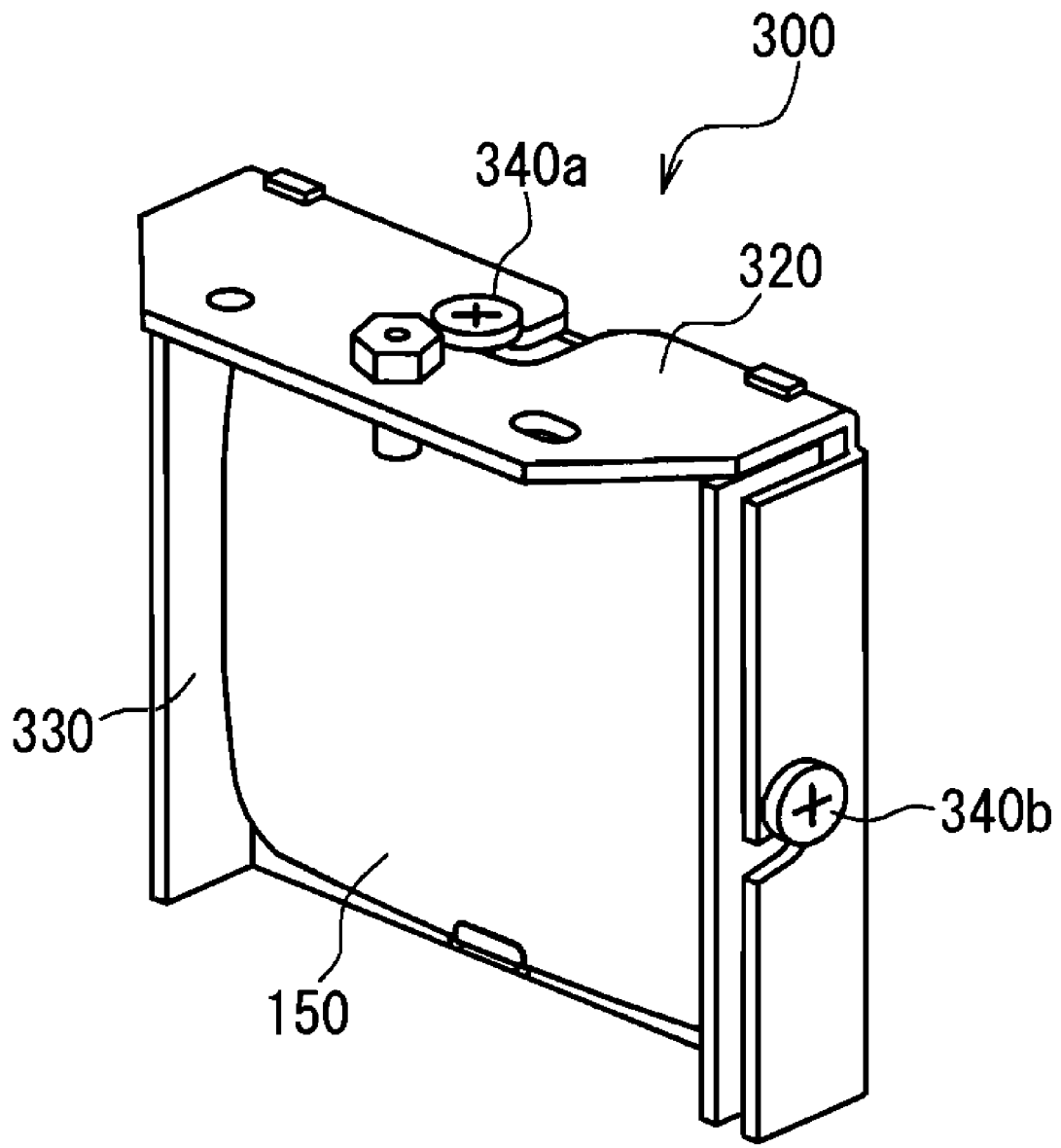
FIG. 7 is a perspective view showing a lens position adjusting mechanism of a conventional example.

On the other hand, when the center of the lens 1 is moved in a Y-direction (vertical direction), the operation is conducted as shown in FIGS. 5A, 5B, 6A, and 6B. That is, by operating the lug portion 2d, the lug portion 2d is moved in the Y-direction with the shaft portion 2b sandwiched by the shaft guide groove 5 as a rotating fulcrum. The state in which the lug portion 2d is moved upward and the state in which the lug portion 2d is moved downward are shown in FIG. 5B and FIG. 6B, respectively. Thus, the center of the lens 1 can be moved between a point 11c on the upper side (FIG. 5A) and a point 11d on the lower side (FIG. 6A).

The movable range in the Y-direction in this case can be set freely within the sizes in the Y-direction of the frame guide groove 3c of the lower holding case 3 and the frame-regulating recessed portion 4b of the upper holding case 4.

By combining the above-described movements in the X-direction and the Y-direction, the position of the center of the lens 1 can be adjusted within the movable range.

Further, by providing the lens attachment frame 2 with the lug portion 2d for adjustment, the position adjustment by hand or a jig can be performed smoothly.

Next, a bonding method for fixing the lens position in a temporarily fixed state after the lens position adjustment will be described with reference to FIGS. 1A, 1B, and 2A-2C.

As shown in the drawings, the lens attachment frame 2 and the lower holding case 3 respectively are provided with a plurality of adhesion grooves 2e, 2f and 3d, 3e, which are disposed parallel to one another. The reason for providing a plurality of grooves is to secure an overall width that is enough to absorb the displacement in adjustment and to secure an adhesion area.

Further, as shown in an enlarged view of a main portion of FIG. 2C, the adhesion grooves 3d of the lower holding case 3 are formed in a two-step depth. The adhesion grooves 3e have the same configuration. Thus, a space formed by coupling a plurality of the adhesion grooves 3d and the adhesion grooves 2e, and a space formed by coupling a plurality of the adhesion grooves 3e and the adhesion grooves 2f are created, respectively.

Furthermore, the adhesion grooves 2e, 2f of the lens attachment frame 2 may be formed in a two-step depth. Alternatively, both the adhesion grooves 3d, 3e of the lower holding case 3 and the adhesion grooves 2e, 2f of the lens attachment frame 2 may be formed in a two-step depth.

In the case of fixing the lens position fixed temporarily after the lens position adjustment, an adhesive material is injected and applied to the spaces formed of a plurality of the adhesion grooves 3d and the adhesion grooves 2e, and a plurality of the adhesion grooves 3e and the adhesion grooves 2f, whereby the adhesive material is poured into the respective adhesion grooves. Accordingly, the adhesive forms a wedge shape extending across both the lower holding case 3 and the lens attachment frame 2, thereby keeping the adhesion strength.

Further, by setting the range, shape, number, and the like of a plurality of the adhesion grooves 3d and the adhesion grooves 2e, and a plurality of the adhesion grooves 3e and the adhesion grooves 2f, respectively, in accordance with the range where the lens attachment frame 2 can move relatively with respect to the lower holding case 3 for the lens position adjustment, sufficient adhesion strength can be attained within the movable range.

Further, in place of the configuration in which the elastic portion 2c is formed integrally with the lens attachment frame 2 as shown in the present embodiment, a spring material, for example, may be adopted as a separate body and attached to the lens attachment frame 2.

Further, in place of the configuration in which the elastic portion 2c is provided on the lens attachment frame 2 side, the elastic portion 2c may be provided on the lower holding case 3 side.

Further, in place of the configuration in which an adhesive is used for fixing the lens attachment frame 2 and the lower holding case 3 after they are fixed temporarily by the biasing force of the elastic portion 2c, a screw, for example, may be used.

Furthermore, when the adjustment is made by a jig, the biasing force of the elastic portion 2c of the lens attachment frame 2 can be increased. In that case, it is not necessary to adopt an adhesive or the like for the fixation.

As described above, in the lens position adjusting mechanism according to the present embodiment, the lens attachment frame 2 with the lens 1 attached thereto is placed between the lower holding case 3 and the upper holding case 4, and the shaft portion 2b provided on the lens attachment frame 2 is allowed to function as a fulcrum which enables the lens attachment frame 2 to move in the X-direction and to rotate in the Y-direction. This allows the lens attachment frame 2 to move in the X-direction and the Y-direction, whereby the lens position can be adjusted easily. The bonding using an adhesive after the completion of adjustment and temporary fixation makes it possible to position an illumination light region in an image-forming region of an image display element promptly and accurately with a simple configuration. Thus, the workability in adjustment, fixation, and the like of the lens position can be improved.

The lens position adjusting mechanism of the present invention is capable of adjusting an illumination light region vertically and horizontally within an image-forming region of an image display element with a simple configuration, and therefore, is useful as a lens position adjusting mechanism of a projection-type display device and others.

What is claimed is:

1. A lens position adjusting mechanism comprising:
    a lens;
    a lens attachment frame that includes a lens holding portion for holding a rim of the lens; and
    a holding case that sandwiches the lens attachment frame movably in a plane direction perpendicular to an optical axis of the lens,
    wherein the lens attachment frame includes a shaft portion on a periphery of the lens holding portion, the shaft portion functioning as a fulcrum at a time when the lens attachment frame moves in the plane direction, and
    the holding case includes a shaft supporting portion for supporting the shaft portion of the lens attachment frame movably in one direction and a frame guide groove for sandwiching the lens attachment frame, and
    either the lens attachment frame or the holding case has an elastic portion, and the lens attachment frame is biased in the direction of the holding case by the elastic portion in a state in which the lens attachment frame is sandwiched in the frame guide groove of the holding case.

2. The lens position adjusting mechanism according to claim 1, wherein the lens holding portion is thicker than the lens.

3. The lens position adjusting mechanism according to claim 1, wherein the lens attachment frame has a lug portion configured to be held by a finger or an adjustment appliance on the periphery of the lens holding portion.

4. The lens position adjusting mechanism according to claim 1, wherein the shaft portion of the lens attachment frame is in a columnar shape.

5. The lens position adjusting mechanism according to claim 1, wherein the shaft supporting portion of the holding case is formed of a shaft guide groove separable into upper and lower portions so as to support the shaft portion of the lens attachment frame movably in one direction.

6. The lens position adjusting mechanism according to claim 1, wherein the elastic portion is formed integrally with either the lens attachment frame or the holding case.

7. The lens position adjusting mechanism according to claim 1, wherein the lens attachment frame has a configuration in which the shaft portion is disposed on one side and the elastic portion is disposed on a side opposite to the shaft portion with the lens interposed therebetween.

8. The lens position adjusting mechanism according to claim 7, wherein the lens attachment frame has a lug portion configured to be held by a finger or an adjustment appliance on the periphery of the lens holding portion, the lug portion being provided on the elastic portion side.

9. The lens position adjusting mechanism according to claim 1, wherein the lens attachment frame and the holding case have an adhesion groove for application of an adhesive material.

10. The lens position adjusting mechanism according to claim 9, wherein the adhesion groove is formed of a plurality of grooves disposed parallel to one another.

11. The lens position adjusting mechanism according to claim 10, wherein the adhesion grooves respectively are provided so as to be opposed to each other in the lens attachment frame and the holding case, thereby forming a wedge space extending across both the lens attachment frame and the holding case.

12. The lens position adjusting mechanism according to claim 11, wherein at least one of the adhesion grooves provided in the lens attachment frame and the holding case is formed in a two-step depth from respective surfaces of the lens attachment frame and the holding case.

13. A projection-type display device comprising:
a light source that emits illumination light;
an image display element that forms an optical image by modulating the illumination light;
the lens position adjusting mechanism according to claim 1 that includes a lens for positioning the illumination light from the light source in an image-forming region of the image display element; and
a projection optical system that enlarges and projects the optical image formed by the image display element.

* * * * *